(12) United States Patent
Saitoh

(10) Patent No.: US 6,616,462 B2
(45) Date of Patent: Sep. 9, 2003

(54) CONVERTIBLE MULTI-DIAMETER SLEEVE FOR OPTICAL FIBER CONNECTORS

(75) Inventor: Ken Saitoh, Tokyo (JP)

(73) Assignee: Tonami Electronics Corporation, Tokyo (JP)

( * ) Notice: Subject to any disclaimer, the term of this patent is extended or adjusted under 35 U.S.C. 154(b) by 0 days.

(21) Appl. No.: 09/944,088

(22) Filed: Sep. 4, 2001

(65) Prior Publication Data

US 2003/0044124 A1 Mar. 6, 2003

(51) Int. Cl.[7] .................................................. G02B 6/38
(52) U.S. Cl. .......................................................... 439/72
(58) Field of Search .............................. 385/59, 60, 71, 385/72, 77, 78

(56) References Cited

U.S. PATENT DOCUMENTS

| | | | | |
|---|---|---|---|---|
| 5,067,783 A | * | 11/1991 | Lampert | 385/60 |
| 5,282,259 A | * | 1/1994 | Grois et al. | 385/84 |
| 5,609,501 A | * | 3/1997 | McMills et al. | 439/578 |
| 6,164,835 A | * | 12/2000 | Imasaki | 385/72 |
| 6,173,099 B1 | * | 1/2001 | Kiernicki et al. | 385/78 |
| 6,367,984 B1 | * | 4/2002 | Stephenson et al. | 385/53 |
| 6,471,417 B1 | * | 10/2002 | Wang et al. | 385/72 |

FOREIGN PATENT DOCUMENTS

JP   2001042160 A  *  2/2001

* cited by examiner

Primary Examiner—Khiem Nguyen
Assistant Examiner—Thanh-Tam Le
(74) Attorney, Agent, or Firm—Stevens, Davis, Miller & Mosher, LLP

(57) ABSTRACT

This invention is a convertible multi-diameter sleeve for optical fiber connectors to allow optical fiber cables with plug ferrules of different internal and external diameters to be pushed into the sleeve and connected with precise core alignment keeping stable conditions. The sleeve has at least one slot extending part way along the length of the sleeve.

20 Claims, 3 Drawing Sheets

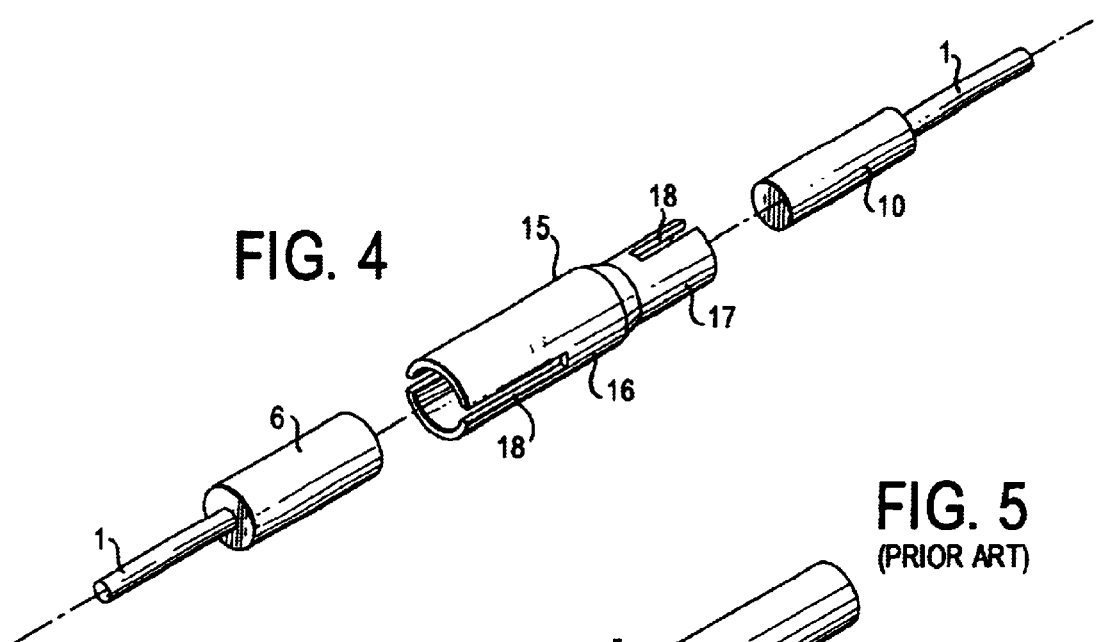
FIG. 4
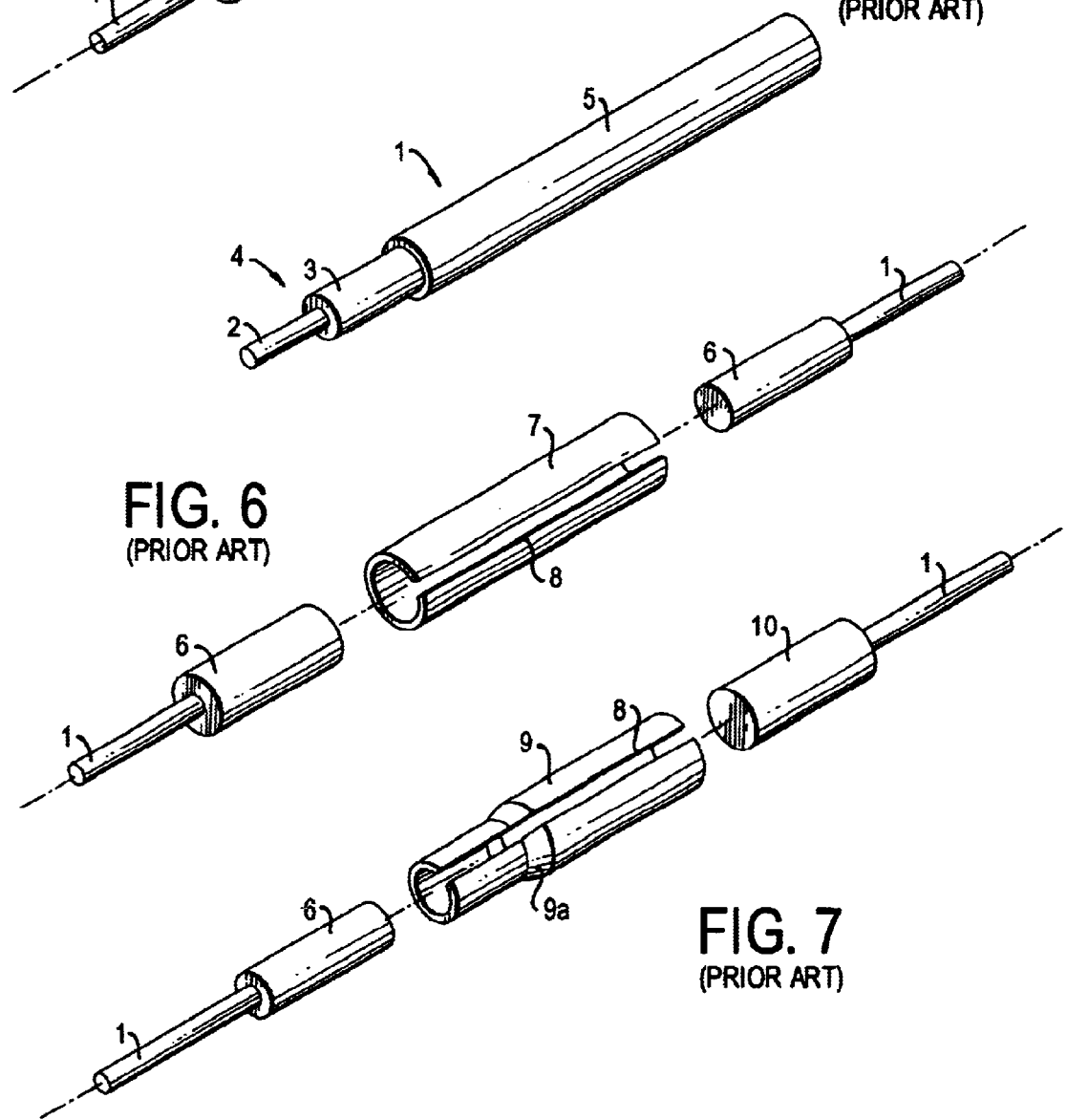
FIG. 5 (PRIOR ART)
FIG. 6 (PRIOR ART)
FIG. 7 (PRIOR ART)

US 6,616,462 B2

CONVERTIBLE MULTI-DIAMETER SLEEVE FOR OPTICAL FIBER CONNECTORS

I. FIELD OF THE INVENTION

This invention is a convertible multi-diameter sleeve for optical fiber connectors to allow optical fiber cables with plug ferrules of different internal and external diameters to be connected with precise core alignment.

II. BACKGROUND DESCRIPTION

Optical fibers are used to transfer communications and data which use the medium of light. An example of the above-mentioned optical fiber cable with a single core (1) is shown in FIG. 5. The optical fiber consists of the fiber core (4), (composed of (2) the core of fibers made of highly pure quartz glass, etc., with different refractive indices, and (3) cladding), and the external sheathing (5) made of nylon and ultraviolet-hardened plastic which covers the fiber core (4).

Optical fiber cables (1) described above are manufactured in various lengths. Fibers are joined together in a semi-permanent bond to produce the length of optical fiber required when the optical fiber cable is laid, but optical fiber connectors which allow easy connection and separation of optical fiber cables are used to connect optical fiber cables and optical devices, and in the construction, maintenance and trials, etc., of optical communications systems.

Optical fiber cables are currently connected by inserting the molded plug ferrules (6) which are attached at the ends of optical fiber cables (1), and which have the same diameter, into each end of a sleeve (7) which has a slot (8) extending along the entire length of the sleeve (thereby giving the sleeve a cross-section shaped like the letter "C"), as shown in FIG. 6.

The problem with the C-shaped sleeve is that the outer diameters of the plug ferrules that are inserted at both ends of the sleeve must be identical.

To overcome the above-described problem a convertible multi-diameter sleeve for optical fiber connectors (9), FIG. 7, which can accept plug ferrules with different external diameters was developed so that optical fiber cables can be connected in places where space is limited for installation and set up. This convertible multi-diameter sleeve is molded to have the shape of a cylinder with different diameters (inner and outer) on the left (9b) and the right (9c) of the sleeve (the diameters change at point (9a) in FIG. 7) and the sleeve has a slot (8) which extends along the entire length of the sleeve (thereby giving the sleeve a cross-section shaped like the letter "C").

IV. BRIEF DESCRIPTION OF THE DRAWINGS

FIG. 4 shows a perspective view to explain connection of optical fiber cables using the sleeve described in the first example of use of the invention.

FIG. 5 shows a perspective view to explain the optical fiber cable for which the invention will be used.

FIG. 6 shows a perspective view to explain connection of optical fiber cables using an existing sleeve.

FIG. 7 shows a perspective view to explain connection of optical fiber cables using an existing convertible multi-diameter sleeve.

Figure 1:
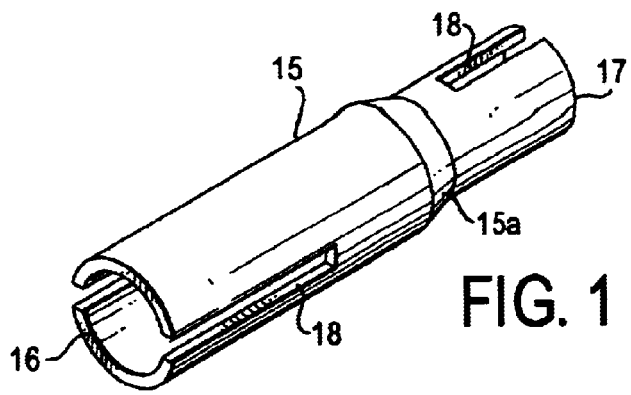
FIG. 1 shows a perspective view to explain the first example of use of the invention.

The following is a list of the name of the numbered elements in the drawings.
1. optical fiber cable
2. core
3. cladding
4. core of fiber
5. external sheathing
6. plug ferrules
7. sleeve
8. slot
9. convertible multi-diameter sleeve
10. plug ferrules
15. convertible multi-diameter sleeve
15a. diameter change portion
16. larger diameter portion
17. smaller diameter portion
18. slot

III. SUMMARY OF THE INVENTION

To connect optical fiber cables using convertible multi-diameter sleeves (9) (FIG. 7) with a slot (8) that extends along the entire length of the sleeve, plug ferrules with different outer diameters (6) and (10) are inserted into the ends of the sleeve. However, the difference between the diameters of the ends of the sleeves creates internal stress in the sleeve and it is difficult to realize stable optical loss and retention with the sleeve.

This invention of a convertible multi-diameter sleeve was made to solve the above-mentioned problems. This newly invented sleeve makes it possible to connect fibers cables firmly for a long time, to avoid imprecise positioning of the core and bends in the core, to maintain precise meeting of the core, and to minimize optical loss at connection points, even if plug ferrules of different outer diameters are inserted into the sleeve.

The present invention provides a sleeve for functionally connecting optic fiber cable, wherein the sleeve has a larger diameter portion, a relatively smaller diameter portion, and a diameter change portion to connect the larger diameter portion and the smaller diameter portion. One or both the larger diameter portion and the smaller diameter portion respectively define one or more slots. The one or more slots along the larger diameter portion extend along a portion of the length of the larger diameter portion, but do not extend to the smaller diameter portion. The one or more slots along the smaller diameter portion extend along a portion of the length of the smaller diameter portion (and may optionally extend into the diameter change portion), but do not extend into the larger diameter portion. In some embodiments, each slot runs part way (less than 100%) along the length of its respective larger diameter portion or the smaller diameter portion. Typically, each slot independently runs along a length of about 70 to about 100% of the length of the larger diameter portion or the smaller diameter portion along which the slot respectively runs.

In a first embodiment, the invention of a convertible multi-diameter sleeve for optical fiber connectors is described as a sleeve for optical fiber connectors to allow optical fiber cables with plug ferrules of different external diameters to be pushed into the sleeve and connected with precise core alignment keeping stable conditions. The features of the sleeve are its cylindrical shape, the different inner and outer diameters on the left and right of the sleeve, and the lengths of the slots running from both the left and right ends of the sleeve parallel to the axis of the cable. The sleeve is typically made by cutting and grinding materials used for springs such as phosphor bronze, beryllium copper, high-carbon steel and stainless steel. For example, the materials used for sleeves may be resilient materials such that the legs defined between the slots can move apart slightly (without breaking) to accept the ferrules being pushed into the sleeve. The slightly pushed apart legs could then have a bias towards returning to their original position and this would exert an internal stress on the ferrules in the sleeve to hold the ferrules in place. However, in this and other embodiments of the present invention, the sleeve material is not restricted to spring material. The sleeve may be made of any suitable material, for example, ceramics such as zirconia or other ceramics, glass fiber, or metals, or polymers.

To connect plug ferrules with different diameters using the invented sleeve, the end of the plug ferrule and the other end of the other plug ferrule are functionally connected by having each plug ferrule contact each other plug ferrule, with the core of the plug ferrules almost completely aligned, Thus, the plug ferrules which are pushed into the sleeve by appropriate methods are connected with precise core alignment keeping stable conditions. The plug ferrules are held in place within the sleeve. Within the sleeve, the plug ferrules accept internal stresses by the sleeve, in other words, the inner walls of the sleeve press on the sidewalls of the ferrules to hold the ferrules in place. However, the ferrules do not press the sleeve due to outside activity, e.g., crimping of the sleeve.

In a second embodiment, the invention of a convertible multi-diameter sleeve for optical fiber connectors is described as a sleeve which is the same as the first embodiment except that the right and left ends of the sleeve have more than one slot cut at identical intervals and at points of symmetry based on the axis.

In a third embodiment, the invention of a convertible multi-diameter sleeve for optical fiber connectors is described as a sleeve to allow optical fiber cables with plug ferrules of different external diameters to be pressed and connected with precise core alignment keeping stable conditions. The sleeve is made by cutting and grinding materials used for springs such as phosphor bronze, beryllium copper, high-carbon steel and stainless steel or made of other above-described materials. The features of the sleeve are its cylindrical shape, the different inner and outer diameters on the left and right of the sleeve, and the length of the slot running from either the left or the right end of the sleeve parallel to the axis of the optic fiber cable.

In a fourth embodiment of the present invention. Each slot has a length extending part way or 100% of the length of the respective portion, wherein each slot of the smaller diameter portion may further extend to at most the terminal of the diameter change portion, but each slot of the larger diameter portion does not extend into the diameter change portion.

V. DETAILED DESCRIPTION OF THE PREFERRED EMBODIMENTS

A. Preferred Embodiments of the Invention

The embodiments of the invention are explained below using FIGS. 1–4a.

FIG. 1 shows a first embodiment of the invention. The figure shows a sleeve (15) which is made by cutting and grinding materials used for springs such as phosphor bronze, beryllium copper, high-carbon steel and stainless steel or made of other above-described materials. The sleeve (15) has a cylindrical shape with different inner and outer diameters on the left and right ends. As shown in the figure, the sleeve has a larger diameter portion (16), a smaller diameter portion (17), and diameter change portion (15a) which is taper shaped. Diameter change portion (15a) is frustoconical, but other taper shapes may be employed. Also, the present invention permits embodiments where only inner walls of diameter change portion (15a) are tapered. There are slots (18) of specified length parallel to the axis in the ends of the larger diameter portion (16) and the smaller diameter portion (17). Each end has two slots positioned diametrically opposite of each other and the slots at one end are in a plane at ninety degrees to a plane in which the slots on the other end of the sleeve are located. The taper shape of diameter change portion in embodiments of the present invention is preferred but not required.

Figure 1A:
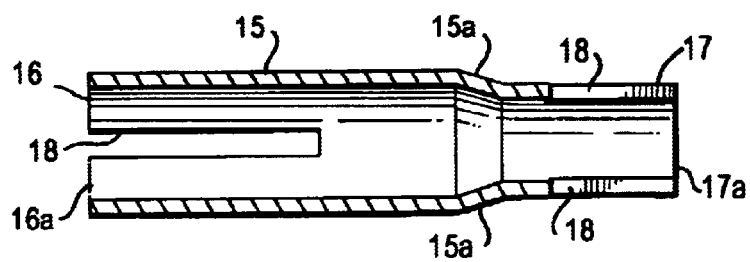
FIG. 1a shows a cross-sectional view of the first example of use of the invention of FIG. 1.

FIG. 1a shows a cross-sectional view of the embodiment of FIG. 1 and further labels opposed outer ends (16a, 17a). As seen in FIG. 1a, the sleeve (15) is hollow to define a continuous path therethrough. The sleeves of FIGS. 2 and 3 are also hollow as is apparent from their intended use.

In the embodiment of FIG. 1a, the slots do not extend to the diameter change portion (15a). As seen in FIG. 1a, every respective slot 18 runs part way along the length of only one respective portion (16, 17). Typically, each respective slot 18 independently has a length of about 70 to about 100% (for example about 70 to about 90%) of the length of one respective portion (16, 17) of the sleeve along which the slot runs.

Figure 2:
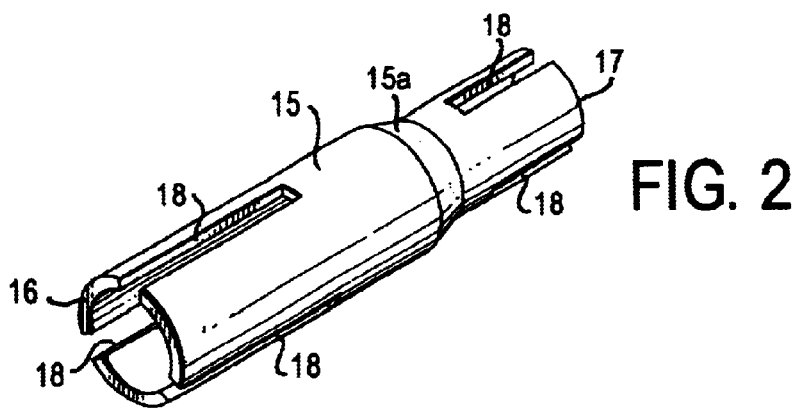
FIG. 2 shows a perspective view to explain the second example of use of the invention.

FIG. 2 shows a second embodiment of the invention. The sleeve (15) in FIG. 2 is molded to have a larger diameter portion (16) and smaller diameter portion (17), and a diameter change portion (15a) which is taper shaped. The sleeve is identical to that in the first embodiment except for the number and position of the slots. In this example, three slots are cut at identical intervals at each end but the slots on one end are positioned at different angles (offset) relative to the slots on the other end.

Figure 3:
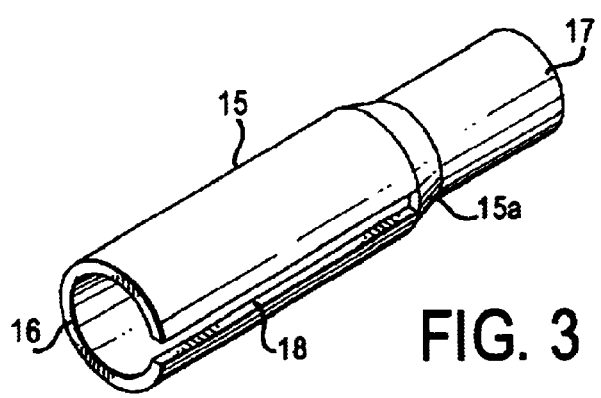
FIG. 3 shows a perspective view to explain the third example of use of the invention

FIG. 3 shows a third embodiment of the invention. The sleeve (15) in FIG. 3 is molded to have a larger diameter portion (16), a smaller diameter portion (17), and a diameter change portion (15a) which is taper shaped. The sleeve (15) is identical to those in the first and second embodiment described above except that only the larger diameter portion (16) of the sleeve (15) has a single slot (18) so this part of the sleeve has the shape of "C". In the embodiment of FIG. 3 the slot 18 runs the entire length of the portion (16).

Figure 3A:
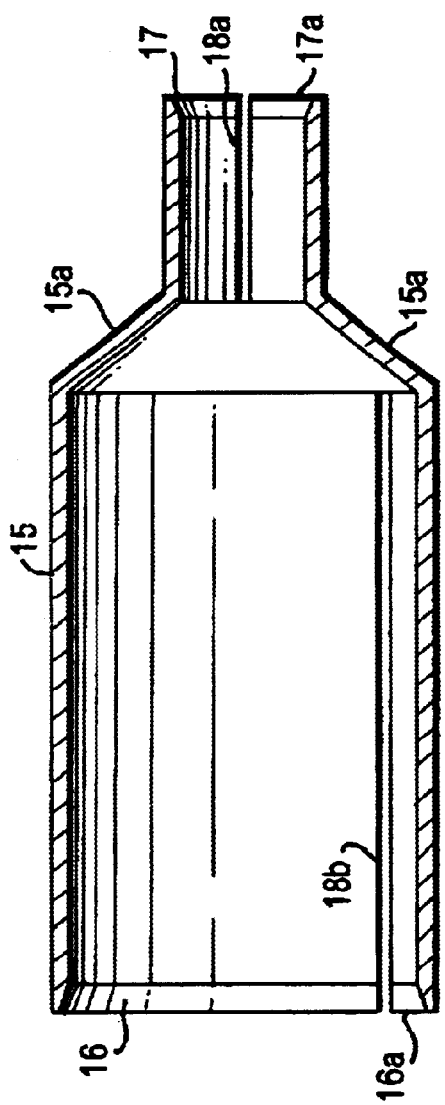
FIG. 3a shows a side view of a fourth embodiment of the present invention.

FIG. 3a shows a side view of a fourth embodiment of the present invention. FIG. 3a shows in the case of the slot length extending 100% of the length of the respective portion, the slot 18a of the smaller diameter portion may further extend to the terminal of the diameter change portion 15a, but the slot 18b of the larger diameter portion 16 does not extend into the diameter change portion 15a.

FIG. 4 shows a perspective view to explain connection of optical fiber cables using the sleeve described in the first example of use of the invention.

Figure 4A:
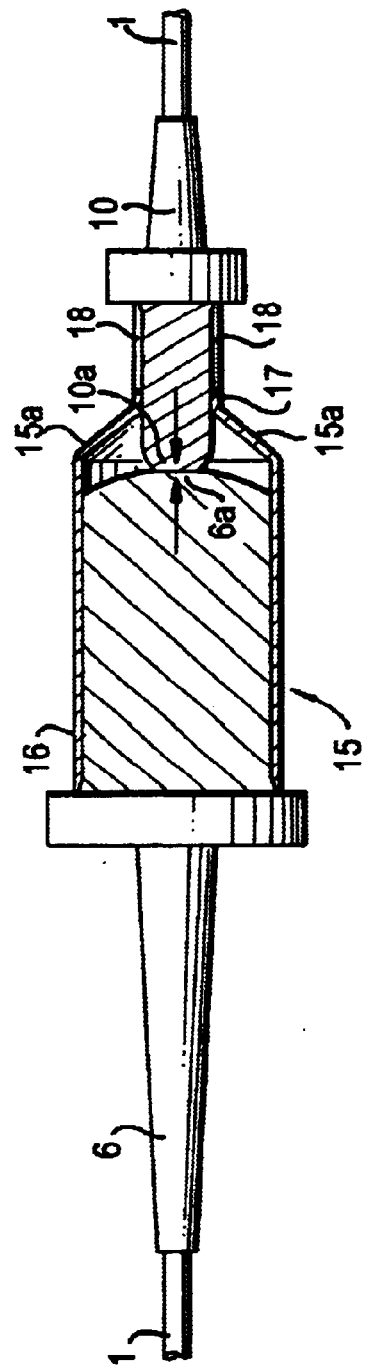
FIG. 4a shows a side view to explain show optical fiber cables inserted into the invention.

FIG. 4a shows a cross-sectional view of the sleeve of FIG. 4 wherein diameter change portion (15a) of the sleeve, at which the diameter of the sleeve changes, is tapered.

To connect plug ferrules with different diameters using the invented sleeve (15) of any of FIGS. 1–3a, insert the larger plug ferrule (6) on the end of an optical fiber (1) into the larger diameter portion (16) of the sleeve (15) and insert the smaller plug ferrule (10) of another optical fiber (1) into the smaller diameter portion (17) of the sleeve (15). Generally, the end of each plug ferrule (6, 10) is inserted into the sleeve (15), always being pushed ahead from behind by appropriate methods until the ends touch with the core of each plug ferrule almost completely aligned with the core of the other plug ferrule. Arrows in FIG. 4a show the direction in which each plug ferrule (6, 10) is pushed into the sleeve (15). Internal stress caused by plug ferrules differ between the larger diameter portion (16) and the smaller diameter portion (17) of the sleeve (15), but the internal stress is adjusted by the slots (18) in both the larger diameter portion (16) and the smaller diameter portion (17). FIG. 4a shows the end (6a) of the plug ferrule (6) and the end (10a) of the plug ferrule (10) are connected with the core of the plug ferrules almost completely aligned and plug ferrules which are pushed into the sleeve by appropriate methods are thus connected with stable conditions (precise core alignment). This completes the functional connection of the optical fibers (1) and the same adjustment features are obtained as when plug ferrules of the same external diameters are connected.

As described in the above embodiments, ferrules are connected using the sleeve of the present invention by the same procedures as employed to connect ferrules with existing connectors. If convertible multi-diameter sleeves with slots on one or both ends are used for convertible adapters with a plastic molded housing, then a large quantity of plastic molded adapters, etc., which have stable optical loss and retention ability, will be able to be supplied.

B. Effectiveness of the Invention

The connection of optical fiber cables with different diameter plug ferrules using the invented sleeve can be completed simply by inserting the plug ferrules into the ends of the sleeve and is just as easy as connecting using existing sleeves. Furthermore, even if plug ferrules with different diameters are inserted into the invented sleeve, the optical fiber core will be positioned correctly and the core will not be bent, so the fibers will be connected accurately and firmly while keeping the cores precisely joined thereby minimizing optical loss at connections.

If the slots on the sleeve extend along the entire length of the sleeve, as in existing sleeves, internal stresses cannot be completely eliminated and optical loss and retention ability vary slightly. The slots of the invented sleeves do not extend the whole length of the sleeve and so internal distortion will be removed completely by heat treatment, making it possible to supply stable convertible multi-diameter sleeves. FIGS. 1 and 2 show a first set of the slots 18 extend only part way along the length of the larger diameter portion 16 and a second set of the slots extend only part way along the length of the smaller diameter portion 17. Moreover, FIGS. 1 and 2 show the slots 18 along the portion 16 are longitudinally parallel but radially offset with the slots 18 along the portion 17 (a radius from the longitudinal axis to a slot of the portion 16 does not fall within the same plane as any radius from the longitudinal axis to a slot of the portion 17). FIG. 3 shows the slot 18 extends the length of only the portion 16.

The invented sleeve described in the second embodiment has slots at both ends positioned at points of symmetry based on the axis which makes connection of optical fiber cables more accurate, firm and keeps the cores more precisely joined.

FIG. 3a shows the slot 18a extending along portion 17 and the diameter change portion 15a while the slot 18b extends along portion 16.

It should be apparent that embodiments other than those specifically described above come within the spirit and scope of the present invention. Thus, the present invention is not defined by the above-described embodiments but is defined by the appended claims.

What is claimed is:

1. A convertible multi-diameter sleeve for optical fiber connectors which connects optical fiber cables using plug ferrules of different outer diameters by pushing said cables into said sleeve while maintaining precise core alignment, said sleeve comprising:

a left portion having a left end and a right portion having a right end, both said left and right portions having a cylindrical shape and are located on a single axis with respect to each other and said left and right portions have different inner and outer diameters; and a taper shaped diameter change portion between said left and right portions, wherein a first member is selected from a group consisting of the left portion and the right portion, wherein said first member has a larger inner diameter and a larger outer diameter than an other member of said group, and the other member of said group has a smaller inner diameter and a smaller outer diameter than said first member;

wherein provided radially with regular intervals on said first member are at least three slots having a length of at least 70% of the length of said first member and extending from a respective end of said first member, and providing on said other member at least one slot which is shifted radially from said slots on said first member and extends from a respective end of said other member; and wherein a length of each slot extending from the left and right ends of the sleeve runs parallel to the single axis.

2. A convertible multi-diameter sleeve for optical fiber connectors as described in claim 1, wherein the other member has more than one slot cut at identical intervals and at points of symmetry based on the single axis and the at least three slots of the first member are cut at identical interval and at points of symmetry based on the single axis.

3. A convertible multi-diameter sleeve for optical fiber connectors as described in claim 1, wherein said sleeve is made by cutting and grinding materials used for springs.

4. A convertible multi-diameter sleeve for optical fiber connectors as described in claim 3, wherein the material is selected from the group consisting of phosphor bronze, beryllium copper, high-carbon steel and stainless steel.

5. A convertible multi-diameter sleeve for optical fiber connectors as described in claim 1, wherein each slot of the left portion are radially offset from each slot of the right portion.

6. A convertible multi-diameter sleeve for optical fiber connectors as described in claim 1, wherein the lengths of the slots of the first member are 70 to 100% of the length of the first member.

7. A convertible multi-diameter sleeve for optical fiber connectors as described in claim 1, wherein the length of each slot of the other member is at least 70% of the length of the other member.

8. A convertible multi-diameter sleeve for optical fiber connectors as described in claim 1, wherein every slot runs along the length of only one member independently selected from the group consisting of said left portion of the sleeve and said right portion of the sleeve.

9. A convertible multi-diameter sleeve for optical fiber connectors as described in claim 1, wherein every slot runs part way respectively along the length of only one respective member independently selected from the group consisting of said left portion of the sleeve and said right portion of the sleeve.

10. A convertible multi-diameter sleeve for optical fiber connectors as described in claim 1, wherein the other member has at least two slots and each said slot of the first member and other member runs less than the entire length of the respective portion.

11. A convertible multi-diameter sleeve for optical fiber connectors as described in claim 10, wherein the slots of the first member are radially offset from the slots of the other member.

12. A convertible multi-diameter sleeve for optical fiber connectors as described in claim 1, wherein slots on said first member extend from a respective end of said first member and along an entire length of said first member.

13. A convertible multi-diameter sleeve for optical fiber connectors as described in claim 1, wherein said at least one slot on said other member extends from a respective end of said other member and into said taper shaped diameter change portion.

14. A convertible multi-diameter sleeve for optical fiber connectors as described in claim 13, wherein slots on said first member extend from a respective end of said other member and along an entire length of said other member.

15. A convertible multi-diameter sleeve for optical fiber connectors as described in claim 12, wherein said sleeve is made by cutting and grinding materials used for springs.

16. A convertible multi-diameter sleeve for optical fiber connectors as described in claim 15, wherein the material is selected from the group consisting of phosphor bronze, beryllium copper, high-carbon steel and stainless steel.

17. A convertible multi-diameter sleeve for optical fiber connectors as described in claim 13, wherein said sleeve is made by cutting and grinding materials used for springs.

18. A convertible multi-diameter sleeve for optical fiber connectors as described in claim 17, wherein the material is selected from the group consisting of phosphor bronze, beryllium copper, high-carbon steel and stainless steel.

19. A convertible multi-diameter sleeve for optical fiber connectors as described in claim 14, wherein said sleeve is made by cutting and grinding materials used for springs.

20. A convertible multi-diameter sleeve for optical fiber connectors as described in claim 19, wherein the material is selected from the group consisting of phosphor bronze, beryllium copper, high-carbon steel and stainless steel.

* * * * *

UNITED STATES PATENT AND TRADEMARK OFFICE
CERTIFICATE OF CORRECTION

PATENT NO. : 6,616,462 B2
DATED : September 9, 2003
INVENTOR(S) : Ken Saitoh

It is certified that error appears in the above-identified patent and that said Letters Patent is hereby corrected as shown below:

<u>Title page,</u>
Item [73], the Assignees should read -- Tonami Electronics Corporation and Apollo Communications Co., Ltd. --.

<u>Column 6,</u>
Line 41, should read -- intervals and at points of symmetry based on the single axis. --

Signed and Sealed this

Twenty-third Day of December, 2003

JAMES E. ROGAN
*Director of the United States Patent and Trademark Office*